Jan. 3, 1967  L. E. DE NEERGAARD  3,296,606
CONTROL SYSTEM FOR MACHINE TOOLS UTILIZING MAGNETIC RECORDING
Original Filed April 13, 1959  3 Sheets-Sheet 1
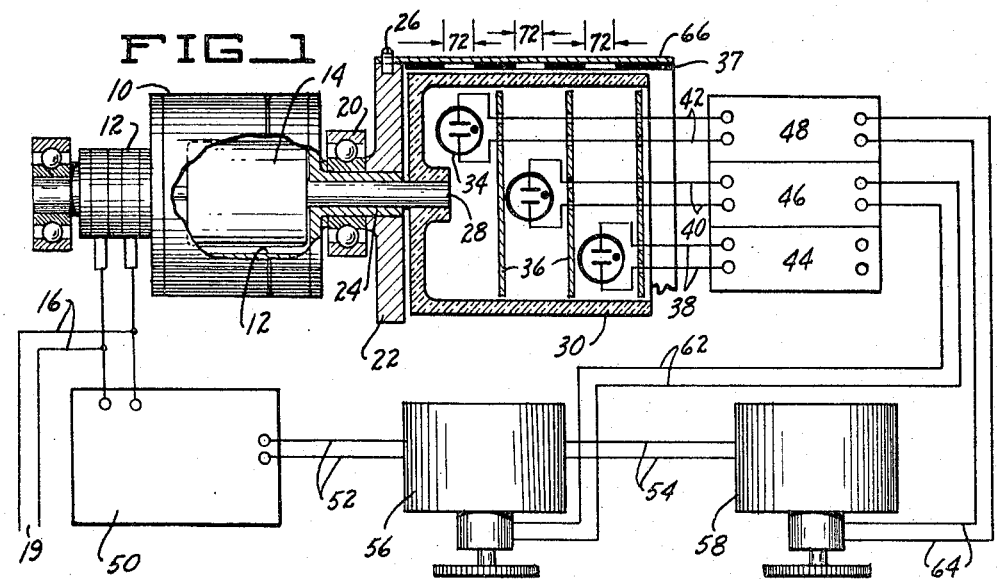
FIG_1
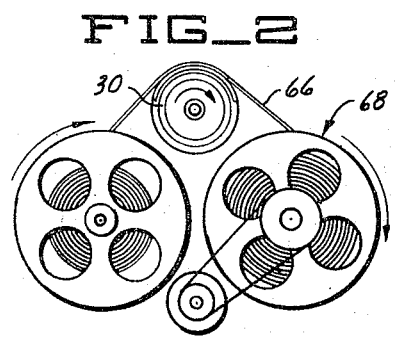
FIG_2
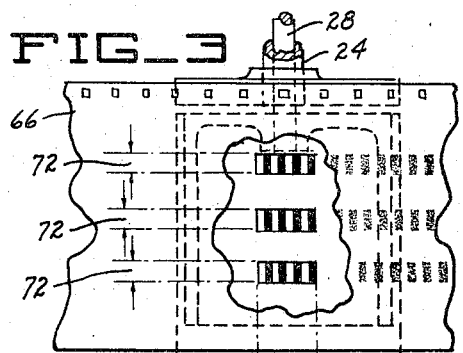
FIG_3
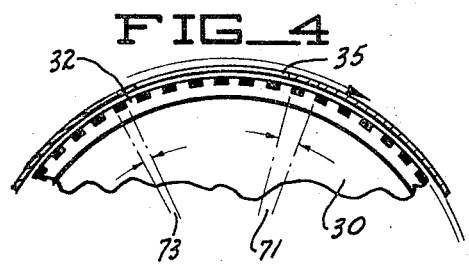
FIG_4
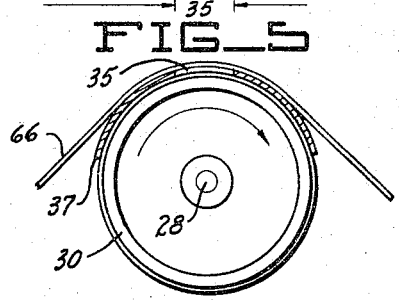
FIG_5
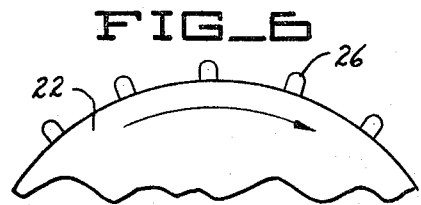
FIG_6
INVENTOR.
Leif Eric DeNeergaard, deceased
BY Northern Trust Co., Executor
BY Parker & Carter
ATTORNEYS.

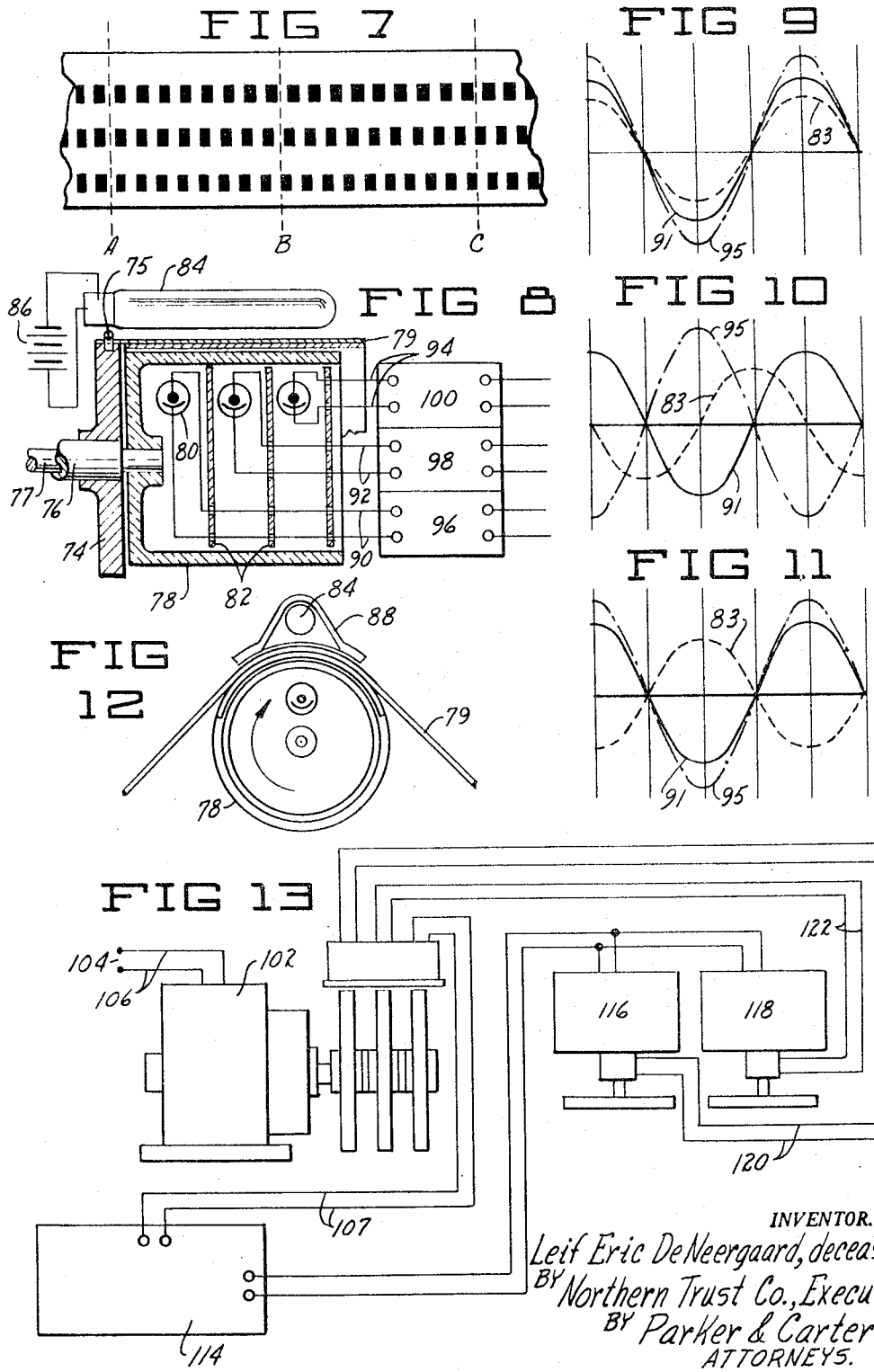

Jan. 3, 1967     L. E. DE NEERGAARD     3,296,606
CONTROL SYSTEM FOR MACHINE TOOLS UTILIZING MAGNETIC RECORDING
Original Filed April 13, 1959     3 Sheets-Sheet 3
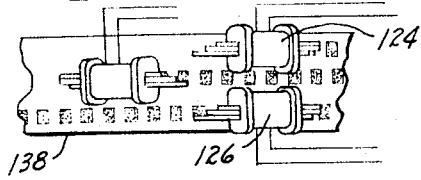
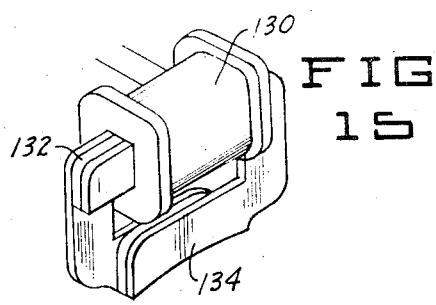
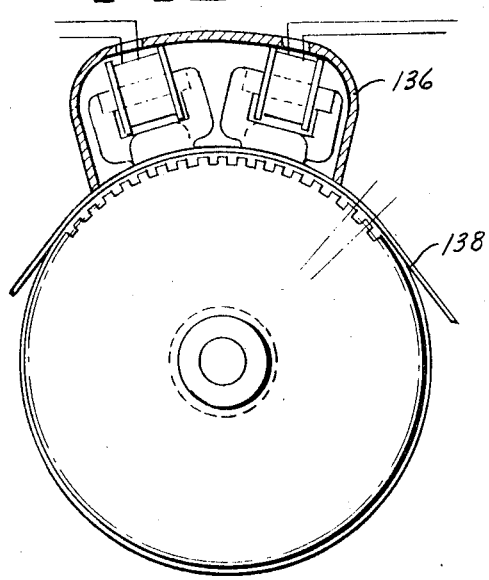
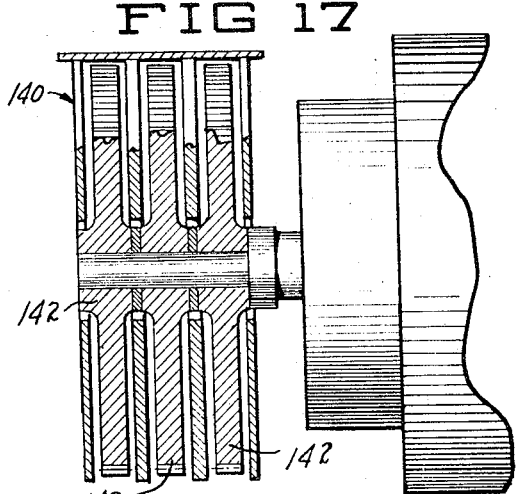
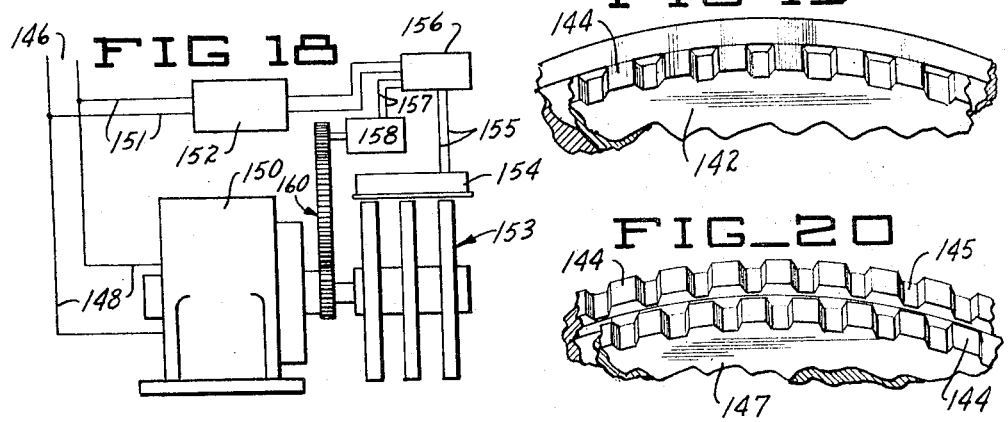
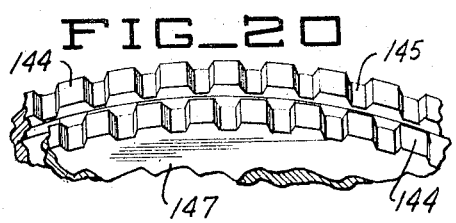
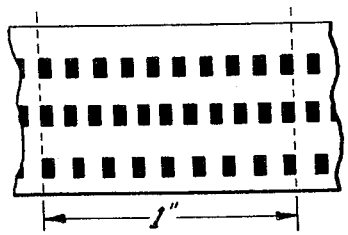
INVENTOR.
*Leif Eric De Neergaard, deceased*
BY *Northern Trust Co., Executor*
BY *Parker & Carter*
       ATTORNEYS.

United States Patent Office 3,296,606
Patented Jan. 3, 1967

3,296,606
CONTROL SYSTEM FOR MACHINE TOOLS UTILIZING MAGNETIC RECORDING
Leif Eric De Neergaard, deceased, late of Chicago, Ill., by the Northern Trust Company, executor, Chicago, Ill., assignors to Frederic W. Olmstead, Washington, D.C., Hans W. Trechsel, c/o The Gisholt Machine Company, Madison, Wis., Deryck A. Gerard, Evanston, Ill., as trustees
Original application Apr. 13, 1959, Ser. No. 805,994, now Patent No. 3,230,516, dated Jan. 18, 1966. Divided and this application Oct. 4, 1965, Ser. No. 506,617
3 Claims. (Cl. 340—174.1)

This application is a division of application Serial No. 805,994, filed April 13, 1959, now U.S. Patent 3,230,516.

This invention relates to a method of and apparatus for recording mechanical displacements, and further relates to a method of and apparatus for directing mechanical movement in response to recorded intelligence. In particular the invention relates to a method of and apparatus for recording the movements of a machine tool or the like on a moving tape, and additionally relates to a method of and apparatus for playing back the tape so that one or a plurality of machine tools may have their movements directed thereby.

One purpose of this invention is a recording system which records the relative movement of a member along different co-ordinates by means of the instantaneous phase differentials between electric signals.

Another purpose is a recording device in which the intelligence to be recorded is transmitted from a rotating recording drum onto a moving tape, the differential speed between the rotating drum and the tape remaining constant.

Another purpose is a recording system which records the movement, in different co-ordinates, of a machine tool or the like, movement of the tool along any one co-ordinate causing an electric signal to be displaced in phase in relation to a synchronizing signal.

Another purpose is an improved means for magnetically recording the movements of a machine tool or the like on a moving tape.

Another purpose is a method of translating the movements of a machine tool into a plurality of phase varying electrical signals which may be recorded on a photographic film or the like.

Another purpose is an improved method of maintaining a constant differential speed between a recording drum and a moving tape which receives signals from the drum.

Another purpose of this invention is an improved method of translating recorded signals on a moving tape into movement of a machine tool.

Another purpose is an improved method of scanning a moving tape having recorded intelligence thereon.

Another purpose is an improved system, utilizing a rotating scanner, for scanning a moving tape having recorded intelligence thereon.

Another purpose is a means for maintaining a constant differential speed between a moving tape having intelligence recorded thereon and a rotating scanner.

Another purpose is a means of mechanically maintaining a set differential speed between a moving tape and a rotating scanner adjacent the tape.

Another purpose is a means of scanning a tape having intelligence recorded thereon in which the phase of each of a plurality of recorded signals is compared with the phase of a recorded synchronizing signal.

Another purpose is an improved means of scanning a linearly moving tape, having intelligence recorded thereon, utilizing a scanner rotating at a constant predetermined rate relative to the tape.

Another purpose is a method of scanning or playing back a moving tape on which are impressed pitches representing cyclic signals of a predetermined frequency which vary in their phased relationships.

Another purpose is an improved method of scanning a moving tape having areas of varying light conductivity which method produces a phase varying cyclic signal of a predetermined frequency.

Another purpose is an improved structure for magnetically recording or playing back information to or from a moving tape.

Another purpose is an improved magnetic means for recording or playing back a tape having intelligence recorded thereon, which uses a rotating drum to modulate magnetic flux.

Another purpose is an improved magnetic recording means utilizing a stationary recording head and a rotating drum to vary the reluctance in the magnetic circuit.

Another purpose is a recording or reproducing system which utilizes a linearly moving tape and a rotating scanner of recording head, the differential speed between the tape and the scanner or rotating recording head being maintained at a constant predetermined level.

Other purposes will appear in the ensuing specification, drawings and claims.

The invention is illustrated diagrammatically in the following drawings wherein:

FIGURE 1 is a schematic showing of a recording system embodying the principles disclosed herein.

FIGURE 2 is a side view on a reduced scale of the tape drive system utilized in the invention.

FIGURE 3 is a partially cut-away top view of the recording mechanism of FIGURE 1.

FIGURE 4 is a partially cut-away side view of a recording drum on an enlarged scale.

FIGURE 5 is a side view on a reduced scale of the recording drum showing the relationship between the tape and the drum.

FIGURE 6 is a partially cut-away side view of a drive wheel.

FIGURE 7 is a top view of a recording tape.

FIGURE 8 is a schematic view of a playback system or scanner.

FIGURE 9 is a signal diagram showing the phase relationship between recorded signals.

FIGURE 10 is a diagram similar to that of FIGURE 9 in which the phase relationship of the signals has been changed.

FIGURE 11 is a further diagram of the phase relationship of the recorded signals.

FIGURE 12 is a side view of the scanner drum of FIGURE 8,

FIGURE 13 is a schematic showing of a further form of the invention,

FIGURE 14 is a partial top view of an improved magnetic recording or pick-up means, FIGURE 15 is an enlarged perspective view of an electro-magnet used in the magnetic system of FIGURES 14 and 16, FIGURE 16 is a side view of the magnetic recording means of FIGURE 14, FIGURE 17 is a partially cut-away front view of the magnetic recording means of FIGURE 16, FIGURE 18 is a schematic showing of another form of the invention, FIGURE 19 is a partially cut-away perspective view of the magnetic means of FIGURE 17, FIGURE 20 is a partially cut-away perspective view of a further form of magnetic recording means, and FIGURE 21 is a top view of a recorded tape.

Referring now to the drawings, and in particular to FIGURE 1, 10 indicates a suitable synchronous motor.

The motor 10 has a stator 12 and a rotor 14. The stator 12 receives an electrical signal of a predetermined frequency from a suitable line source 19 through wires 16. A synchronous motor suitable for operation in the invention has a unique construction in that both the stator and rotor are rotatable. It should be understood that although both the members can rotate, the differential speed between them does not change. For example, if a rotor had an angular velocity of 60 revolutions per second when the stator was stationary, and the stator was rotated at 10 revolutions per second in the direction of rotation of the rotor, the rotor would then have an angular velocity of 70 revolutions per second, but the relative speed between the rotor and stator would still be 60 revolutions per second.

The stator may be connected through a suitable bearing arrangement 20 to a fly wheel or the like 22 which rotates with shaft 24 projecting outwardly from the stator. The exact type of connection between the fly wheel 22 and the stator is not important, and it has only been shown diagrammatically. The fly wheel 22 may have a plurality or series of teeth 26 projecting from its outer periphery, the teeth forming the fly wheel into a gear-like structure. The teeth 26 are adapted to engage one edge of a tape or film strip hereinafter described.

A second shaft or rotor shaft 28 is freely rotatable within the main shaft 24 and has a scanner or recording drum 30 rigidly mounted thereon. The rotor and stator then may rotate independently of each other. As shown in FIGURE 1, the drum 30 is adapted to function as a recorder whereas in FIGURE 8 a similar drum is adapted to function as a scanner or playback mechanism. The drum 30 may either be in the form of a hollow metal or steel drum in which case 32 designates a plurality of slots or openings formed in the outer periphery of the drum, or it may be formed from glass or some other transparent material, in which case 32 designates the spaces of openings between opaque strips. As shown in the drawings the drum is formed from a transparent material. The important thing is that there be a plurality of spaced slots or openings through which light can be transmitted, the space between the openings being either solid metal or opaque so that light cannot pass through.

Within the recording drum 30 are a plurality, in this case three, lighting devices 34, which as shown in the drawings, take the form of glow discharge tubes. Although glow discharge tubes have been found to be satisfactory there are numerous other types of similar devices such as strobotac tubes which will function equally well. In the invention as shown in the drawings there are three channels on the tape and so three separate lighting devices have been shown, however, the invention is not limited to only three lighting devices or three channels. A plurality of shields 36 are disposed between adjacent discharge tubes 34 so that light from any one tube will not get into an adjacent area and expose another film area or channel. As shown in the drawings, the lighting devices and the shields do not rotate with the recording drum. The lighting devices 34 are fed by wires 38, 40, 42 which in turn connect to terminal blocks 44, 46, or 48. The block 44, 46 and 48 may be merely connections between the lighting devices and signal generators hereinafter described or they may designate amplifiers or the like which are used to increase the voltage applied to the lighting devices.

The wires 16 which supply the electrical power from source 19 to the synchronous motor also supply the same electrical signal to a terminal block or frequency multiplier 50. If a signal of the same frequency as the motor is to be used in the signal generators, 50 designates a terminal block. If however the signal used in the signal generator is a multiple of the synchronizing frequency then 50 designates a frequency multiplier. Wires 52 and 54 in turn supply the signal from 50 to signal generators 56 and 58.

The signal generators 56, 58 are suitably connected to a measuring device, not shown in the drawings, which is adapted to follow the contour of a member upon which has been performed certain machine tool operations. Any movement of the measuring device will change the instantaneous phase of the signal put out by the particular signal generator involved.

Wires 62 carry the signal from signal generator 56 to terminal block or amplifier 46 and from there into one of the discharge tubes or strobotacs, and wires 64 carry the signal from signal generator 58 to terminal block or amplifier 48 and from there into another of the glow-discharge tubes or strobotacs. Two signal generators have been shown, but it should be understood that terminal block or amplifier 44 would also connect to a signal generator.

A tape or strip 66 is adapted to be moved by a suitable tape drive system, indicated generally at 68 in FIGURE 2, over the recording drum 30. One edge of the tape has been perforated or suitably slotted so that it will engage the outwardly projecting teeth 26 on fly wheel 22. By connecting the tape and the fly wheel the speed of the tape and the stator will precisely coincide. In other words, the tape, which is engaged by the teeth 26, moves the fly wheel 22, the fly wheel in turn moves the stator of the synchronous motor. By so doing, the differential speed between the moving tape and the rotating recording drum 30 is held constant.

The lower portion of the tape has been covered by a suitable emulsion which is light sensitive. As the recording drum 30 rotates and the glow discharge tubes therein alternately flash as the voltage is applied to them, the light from the tube will shine through the slots 32 in the rotating drum and will expose a predetermined area of emulsion on the tape 66. As shown on the drawing there are three channels each of equal width 72, the width being determined by the width of the slots.

The intelligence recorded on the tape is in the form of spaced pitches such as shown on the tape of FIGURE 7. The distance between adjacent recorded pitches and the size of the pitch will depend upon the differential speed between the tape and the drum, the spacing 71, the size 73 of the opaque strip or metal area between slots, and the frequency and phase of the signal applied to the tubes. It will also depend upon the size of window 35 in the mask 37. As clearly shown in FIGURES 3, 4, and 5, a mask 37 has been placed over the rotating drum and is effective to prevent light from the lighting devices from exposing the tape. Window 35 determines the amount of tape that is exposed at any one instant of time.

Referring now to FIGURE 8, a pick-up system or scanner is diagrammatically shown. Such a scanner could be utilized with the recording system hereinbefore described. A fly wheel 74, having projecting teeth 75, may be attached, similar to the attachment described in the recorder, to the stator of a synchronous motor by means of a shaft 76 projecting outwardly from the stator. A rotating drum or scanner 78 may be rigidly mounted on a rotor shaft 77 which projects outward from the rotor and is freely rotatable within the shaft 76. The particular construction of the drum 78 is generally similar to that of the drum 30 described in the recording system, and may be either of metal or of a transparent material. The drum 78 has suitable slots around its outer periphery which may be in one, two, or three channels depending upon the particular system used. Tape 79 may be suitably connected to the fly wheel 74 by means of teeth 75 and corresponding perforations or slots in the tape so that the speed of the tape and the speed of the stator are the same. The differential speed between the stator and the rotor in a playback or scanning system should be the same as the differential speed used in the recording system.

Disposed within the scanning drum 78 is a plurality, in this case three, photoelectric tubes or similar light sensitive devices 80. The photoelectric tubes are shielded from one another by suitable shielding members 82 similar to the shielding members of the recording system. The photoelectric tubes 80 are disposed such that they will be exposed to light coming in from the slots of the rotating scanner.

Disposed above the rotating scanner and moving tape is a suitable lighting device 84 which is connected to a suitable source of electric energy 86. FIGURE 12 shows an end view of a lighting arrangement which would be satisfactory. A shield or the like 88 encloses the lamp 84 so that only a certain predetermined area of slots of the rotating drum 78 will be exposed to light. The shield 88 may perform a function similar to the mask 37 in the recording system, or a mask may be added if desired.

Wires 90, 92, and 94 connect the photoelectric cells with terminal blocks 96, 98, and 100. The blocks 96, 98, and 100 may represent phase comparators connected between the photoelectric cells and suitable motors which will drive the machine tool or the like or they may be amplifiers designed to step up the voltage or current, as the case may be, of the signals received from the photoelectric cells.

An example will be given to more clearly describe the invention. Assume that a scanner has an annular velocity of 60 revolutions per second and that in each channel there are 100 openings or slots spaced around the circumference, the distance 71 being equal to 0.1 inch. In one second there will be 6000 scanner openings passing a given point. Also assume that during this same one second the shield 88 permits a one inch strip of tape to be scanned. A suitable strip, which is shown in FIGURE 21, has three channels recorded thereon. The number of pitches in a given length of one channel, for example the length of strip exposed by the shield, may not be equal to the number of pitches in an adjacent channel. Channel 1, this being the top channel, has ten pitches per inch whereas channel 2, or the middle channel, has 11 pitches per inch, and channel 3, or the bottom channel, has 9 pitches per inch. The photo-electric tubes in the scanner then will be modulated so that each of the three tubes will receive 6000 flashes per second if the tape is not moving. Although the amplitude of the flashes received might differ because of the different number of pitches per inch in each channel, this is not important as this is a phase shift system. If the tape is given a linear velocity of one inch per second, each of the three tubes would be modulated to receive 6010, 6011 and 6009 flashes per second. However, as any movement of the tape will give a corresponding movement to the stator of the synchronous motor, the number of flashes received by the photo-electric tubes will be 6000, 6001 and 5999 respectively. In other words, moving the tape at a linear velocity of one inch per second adds to the number of flashes, but as at the same time the stator is also moved with a rotational velocity equivalent to this linear velocity, ten flashes per second must always be subtracted. The signal in channel 2 then has a phase difference of 360° per second with the signal in channel 1 or in other words, it leads the signal in channel 1 by 360° per second. The signal in channel 3 on the other hand lags the signal in channel 1 by 360° per second. The signals all have the same nominal or base frequency, but differ in phase. This phase differential is the intelligence that is used to cause variation in the movement of the machine tool performing the work. It should be noted that correct phase differentiations in this system can only be had when the differential speed between the tape and the rotating drum is held constant. As has been described earlier the differential speed may be held constant either by means of a mechanical interlock such as shown in FIGURE 1 or by means of an electrical system which will be described hereinafter. The importance of maintaining a constant differential speed can easily be seen. If the differential speed were not held constant it would be impossible to keep the same base frequency when the tape is moving. The example above was concerned with a play back means or scanner, but it should be understood that a recorder would function in a like manner.

As was described above, one pitch may represent 360° of phase shift. Fractions of a pitch then would represent a lesser amount of phase shift. It should be realized that a phase shift of 360° or of any amount does not occur instantaneously but actually is a gradual process. This is shown particularly in FIGURE 7. At the left hand side of the tape of FIGURE 7 at line A, the relative size of the pitches and the number of pitches per unit of space is equal. However, at the right hand side of this tape at line C, the size of the pitches and the spacing between them is no longer equal. This change in size and spacing represents phase shift.

A graphic representation of FIGURE 7 is shown in FIGURES 9, 10 and 11. Assume, for example, that in these three graphs a synchronizing signal is represented by the solid sine wave 91. This could be the bottom channel on the tape of FIGURE 7. Assume then that the dashed line 83 of FIGURES 9, 10 and 11 represents movement of a machine tool in the X coordinate. This could be the center channel of the tape of FIGURE 7. The broken line 95 on the three graphs might represent movement of a machine tool in the Y coordinate. This could be the top channel of FIGURE 7. As was stated earlier, the left hand side of the tape or line A, of FIGURE 7, shows in phase condition between the signals representing movement in the X and Y coordinates and the synchronizing signal. This is graphically shown in FIGURE 9. About midway through the tape of FIGURE 7 or at line B, the middle and upper channels have been displaced in phase from the lower channel and their signals now lag the synchronizing signal. The dashed line representing the middle channel or movement in the X coordinate now lags the synchronizing signal by approximately 90°, and the broken line representing the upper channel now lags the synchronizing signal by 360°. It can be seen then that there is a gradual change rather than an instantaneous change in the phase relationships between the signals. The gradual change is translated into a gradual change in the movement of a machine tool in the X and Y coordinates.

The tape of FIGURE 7 was explained above with the lower channel being called a synchronizing channel. It should be realized that this channel might direct movement in the Z coordinate instead of being a synchronizing signal. This would be the case where the mechanical interlock of FIGURE 1 controls the differential speed between the tape and the scanner as no synchronizing channel is needed when the mechanical interlock is used. A synchronizing signal, for phase comparison purposes, could be supplied by a source having the same frequency and phase as source 19 or the recorder source. If an electrical means is used to control the differential speed the lower channel may be a synchronizing channel.

Thus, it will be seen that described herein is an accurate device for recording displacements of a measuring element which may be moving along the contours of a machined piece of material or along a template, or, if desired, the motion may be simulated. The movements are first translated into electrical energy, the electric signal which may vary in phase is then recorded on a moving tape or other type of storage member. This same tape is utilized to provide the signals to control motion of suitable machine tool slides. It will be seen that the movements of the measuring element are recorded as instantaneous differences in phase.

In FIGURE 13 a further embodiment of the invention is shown which may utilize either a magnetic or light means for recording the movements of the measuring element onto a moving tape. If magnetic means is to be used, the storage member may be stainless steel or any other suitable material adapted to have magnetic signals recorded thereon. A motor 102 may be fed from a suitable source of electrical energy 104 by means of wires 106. In this form of the invention the tape has one pre-recorded channel thereon. As shown in the drawings, the right hand channel has a synchronizing signal recorded thereon prior to the use of the tape. This channel may be pre-recorded by any suitable means, for example by a recording system similar to that described in FIGURE 1 using a magnetic rather than a light recorder.

When using a magnetic recording system with a pre-recorded tape, any channel may be adapted to act as a scanner so that the signal, in the form of magnetic flux traces, pre-recorded on the tape will be picked up by a scanner such as will be described later. In FIGURE 13, the right hand channel has been designated as the scanner channel for purposes of illustration. The signal picked up from the right hand channel is fed by wires 107 into a suitable amplifier or the like 114. The amplifier 114 may step up the voltage or current, as the case may be, so that the signal is suitable for use in signal generators 116 and 118. These signal generators are similar to those described in conjunction with the system of FIGURE 1. As was described before, movement of a measuring device will vary the instantaneous phase of the signal put out by the signal generators. The signal from the generators 116 and 118 is carried by wires 120 and 122 to the other two channels on the recording mechanism. It will be seen then that the synchronizing frequency pre-recorded on the right hand channel fixes the frequency of the signals produced by signal generators 116 and 118. The signals produced will have their phase shifted by movement of the measuring device in one or more coordinates. Any change in the direction of movement or velocity of the tape will change the frequency of the tape and will change the frequency of the synchronizing signal. However, the important thing is that regardless of any change in the synchronizing frequency, it is the synchronizing frequency that is always used in the signal generators 116 and 118. Even though the synchronizing signal itself may vary, the signals recorded on the other two channels will always have the same frequency as the synchronizing signal. Whereas in the mechanical system described above the recorded signals were maintained at the same nominal or base frequency by means of a mechanical interlock which held the differential speed between the tape and the rotor constant, in this system I maintain all channels at the same frequency by using a synchronizing frequency, pre-recorded on one channel, which sets the frequency of all channels. As any change in phase will of necessity cause an instantaneous change in frequency, when I use the term nominal or base frequency above, I imply that although there may be instantaneous changes, the frequency will generally remain at the same predetermined base level. This is to be contrasted with the system of FIGURE 13 in which the synchronizing frequency is variable according to tape movement.

FIGURE 13 may also represent a scanner or playback system utilizing the same principles as described above. In this instance synchronous motor 102 is fed from a suitable source of power 104 by wires 106. The tape has three recorded channels thereon. Again assuming the right hand channel is the synchronizing channel, the signal picked up or scanned on this channel is fed by wires 107 to a terminal block 114. Terminal block 114 may designate an amplifier if it would be needed in the system. From terminal block 114 the synchronizing signal is fed to phase comparators 116 and 118. Simultaneously with this operation the signals recorded on the other two channels of the tape are being picked up and carried by wires 120 and 122 to the phase comparators. The phase of the synchronizing signal then is compared with the phase of the signals from the other two channels. Any difference in phase, which is the recorded intelligence, is used to control machine tool slides. It can be seen then that the principle used here is the same as that used in the recording system described above. The frequency of the synchronizing signal may vary, but if it does, so does the frequency of the other channels. The frequencies of the three channels is always the same so that differences in phase may be read.

FIGURE 14 shows the disposition of electromagnets above the moving tape. In the preferred form it has been found satisfactory to have two electromagnets 124, 126 adjacent each other and the third electromagnet longitudinally displaced either forward or backward of the adjacent magnets. By so placing the three electromagnets, the width of the tape may be materially decreased. In FIGURE 15, the electromagnet is shown to comprise a coil 130 surrounding a suitable core 132 which may be made of a material having low retentivity and high permeability. The lower portion or lip 134 of the core 132 is adapted to be disposed directly above the moving tape and is generally parallel to the direction of movement of the tape. As seen in FIGURE 16, the electromagnets are enclosed in a suitable structure 136 which overlies the tape 138, and is radially spaced from the rotating drum described below.

Details of the scanner or recorder are shown in FIGURE 17. A recording drum designated generally at 140 is suitably attached to the rotor of a motor. The recording drum 140 may consist of three rigidly connected spaced rotating fly wheels 142, the outer periphery of each being formed into a series or plurality of projecting teeth 144. This construction is clearly shown in FIGURES 19 and 20. The projecting teeth 144 facilitate the establishment of magnetic traces on the moving tape, as the teeth are closer to the tape and so provide a shorter path for the magnetic flux. In FIGURE 20, two different forms of construction of the wheels 142 are shown. The upper wheel 145 is similar to that shown in FIGURE 19 whereas the lower wheel 147 utilizes gaps or air spaces to localize the magnetic traces rather than projecting teeth. The polarity of the traces formed by fly wheels 147 and 145 would be opposite. The exact details of the structure and method of placing a magnetic signal on a moving tape have not been described herein, however, it should be noted that the recording head or pickup shown herein is unique in that it is fixed and operates with a moving drum. The drum has no windings but merely acts to interrupt or modulate the magnetic flux. The magnetic flux passes from lip 134 through the tape and then to the rotating drum and then back through the tape to lip 134. When recording, the electromagnets are a source of flux; whereas in play back, the storage member or tape is the source of flux. The teeth on the rotating drum provide either more or less reluctance to the magnetic flux path thus formed. In other words, there is a structure on each side of a moving tape which cooperate together to either recorder or pick up intelligence from the tape. The drum, which has no windings, acts as a modulator and provides more or less reluctance to the magnetic circuits.

In FIGURE 18, a further form of the invention is shown which may be utilized with either a magnetic or a light sensitive storage member. Again this system may be utilized as either a recorder or a scanner, and for purposes of illustration will be described as a scanner system. A signal is fed from a source 146, which may be the usual 60-cycle power source, through wires 148 to the stator of a synchronous motor 150. A signal from source 146 is also fed through wires 151 to a frequency multiplier 152. The frequency multiplier will step up the frequency of the source signal to any desired multiple of it. For example, if the scanner had an angular velocity of 60 revolutions per second and there are 100 openings around the circumference of the scanner then the output of the frequency multiplier should be 6000 cycles per second.

The synchronous motor 150 has a suitable scanner indicated generally at 153 mounted thereon. The scanner is driven by the rotor of motor 150. Assuming this is a magnetic system, 154 represents a pickup head similar to that described above. The scanner 153 may have means for scanning three separate channels on the tape. The number of channels however is not essential to the invention and either more or less may be used. In order to maintain the proper differential speed between the tape and the scanner, the signal scanned from the right hand channel, which may be the synchronizing channel, is fed through wires 155 to a phase comparator 156. Using the example described above, the signal picked up on the right hand channel and fed to the phase comparator would have a frequency of 6000 c.p.s. If, however, either the speed of the tape or the speed of the scanner is in error, then the phase of the signal fed to the phase comparator will not coincide with the phase of the signal from the frequency multiplier. The phase comparator will compare the 6000 c.p.s. signal from the frequency multiplier with the 6000 c.p.s. signal produced by scanning the synchronizing channel on the moving tape. If there is any difference in phase between these two signals, this difference will be translated into an error signal and will be fed by wires 157 to a suitable servo motor 158. The servo motor 158 drives a suitable gear arrangement indicated generally at 160 which can drive the stator of the synchronous motor 150. As was described earlier, the stator and the rotor of the synchronous motor may rotate independently of each other. However, even though they rotate independently, the differential speed between these two parts of the motor always remains constant. In this form of the invention the differential speed between the tape and the scanner is maintained by scanning one of the channels on the tape which has a synchronizing signal recorded thereon, comparing the synchronizing signal with a multiple of the line frequency fed to the motor in order to get an error signal. The error signal in turn drives a servo motor which can rotate the stator of the synchronous motor. Rotation of the stator will change the angular velocity of the rotor so that a constant differential speed will be maintained between the tape and rotating drum.

The use operation and function of the invention is as follows:

This invention is concerned with an improved method of recording the displacements of a measuring device which is measuring the machined area of a particular product or a template. The motion representing the movement of the measuring device may also be simulated. The invention also pertains to an improved method of utilizing the data recorded and translating it into movement of a machine tool so that a new product may be produced having the exact size and shape desired. In particular, the invention relates to a method of recording the phase relationships of a plurality of signals. The phase variations are caused by movement at the measuring device along a plurality of coordinates. The same signals are then in turn scanned or picked up by a similar mechanism and utilized to run control machine tool slides or the like.

The invention further relates to a unique method of maintaining a constant differential speed between the moving tape and the rotating recording drum or scanner.

In the drawings I have shown two different methods or means of maintaining such a constant differential speed. The first is a wholly mechanical means in which one edge of a recording tape has been perforated into a series of evenly spaced holes which are adapted to engage projecting teeth from a rotating flywheel. The flywheel in turn is attached to the stator of a synchronous motor. By such a means the stator of the synchronous motor is rotated at a speed exactly equal to that of the tape moving over the recording drum. The recording drum is driven by the rotor of the same synchronous motor and therefore the differential speed between the recording drum and the tape which is the differential speed between the rotor and the stator is held constant. Regardless of which direction the tape goes or regardless of what the speed of the tape is, the differential speed between the tape and the drum is always held constant.

The second type of system is that shown in FIGURE 18. A synchronizing channel is scanned and the signal picked up from it is fed to a phase comparator. The signal picked up is compared with a multiple of the frequency being fed to the synchronous motor. Any phase difference between these two signals is fed to a servo motor which is connected by a gear arrangement to the stator of the synchronous motor. Any difference in phase between the line frequency and the signal picked up from the tape will cause rotation of the stator so that a constant differential speed will be maintained between the tape and the rotor.

In addition to a system in which constant differential speed is used to maintain the same nominal frequency for all recorded signals, I have also shown a system in which I use a synchronizing signal to maintain all recorded signals at the same frequency. This system is shown in FIGURE 13. Although the synchronizing signal may vary in frequency, nonetheless, the frequency of the synchronizing signal and the other signals recorded on the tape is always the same. This preserves the intelligence recorded in the form of phase differentials. Whereas in the differential speed system the frequency of the recorded signals was set by the differential speed between the tape and the rotating drum, and was not allowed to vary, in the system of FIGURE 13 the frequency is allowed to vary, but all channels will have their frequency varied simultaneously. This preserves the correct phase differentials. The important thing in both systems is that the frequency of all signals be the same, whether it be constant or variable.

It should be realized that whereas these systems have been described in conjunction with either a scanner or a recorder, any of the systems may be used with either. Both the recorder and scanner are essentially transducers, in that energy is transferred from one system to another.

Two different methods or means, which can be used with any of the above systems, have been described and shown in the drawings. The first is a method which utilizes light sources as a source of flux to shine through slots of a rotating drum to expose a photographic film or light sensitive storage medium moving above the drum. The same film or tape is later used in a pick up system in which the tape moves above a scanning drum and permits light flux to pass through it onto photoelectric cells disposed within the drum. This is one means which can be utilized with the systems described herein. The signals recorded on the moving photographic film all have the same frequency, the intelligence which is recorded on the film being a difference in the phase relationships between the signals. The intelligence is recorded in the form of a plurality of channels of spaced pitches. The pitches provide areas of more or less light transmissiveness on the storage member. In this particular instance if the signal from a particular signal generator lags the synchronizing signal the glow discharge tube or strobatac tube or other suitable tube which is used as the light source will have its light or flux emitted a few milliseconds or microseconds later than if there was no phase differential. The opposite is true if the signal from a particular signal generator is leading instead of lagging.

In the same manner as described above, photoelectric cells used in conjunction with the storage medium are activated by the light which shines through the storage medium, through the slots in the rotating scanner and onto the photoelectric cells. The number of pitches recorded in any given interval determines the phase of the signal that the photoelectric cell will produce. This signal is fed to a phase comparator which in turn controls a machine tool slide.

In the magnetic recording system a similar operation is utilized. Magnetic traces, again in the form of spaced pitches, are impressed on a moving stainless steel tape. The intelligence recorded is the phase change of the signal. The same phase change is picked up by a play back mechanism such as described herein and may be utilized as above in a phase comparator which is used in conjunction with drive motors which run a machine tool. The rotating drum operates to modulate the flux passing from the fixed recording head or play back head through the tape and back to the head. The spaced teeth on the drum either add or subtract reluctance from the magnetic circuit. I have provided a lip on the electromagnet which overlies the storage medium and is parallel to its direction of movement. This lip facilitates the establishment of a magnetic flux path.

The invention shown and described herein may utilize a base or synchronizing frequency of 60 cycles or a higher frequency may be used. For example a 600-cycle signal has been found to give good results.

I have generally shown and described herein a method of recording control signals and of playing back these same signals to actuate control means. There are many variations to my general method and many different means to practice my method. I may use magnetic means, optical means or otherwise. In all cases I keep the frequency of all recorded signals equal, whether the frequency be variable or constant.

The invention is not limited to the specific details of construction described above and illustrated in the accompanying drawings, but covers all modifications coming within the scope of the following claims.

What is claimed is:

1. A transducer including a flux source, a linearly moving storage member having intelligence recorded thereon, a rotating drum adjacent said linearly moving storage member and positioned to modulate said flux whereby said recorded intelligence is translated into an electrical control signal by means responsive to said flux, a drive mechanism for said rotating drum responsive to changes in speed and direction of said linearly moving storage member whereby the differential speed between said storage member and said rotating drum remains constant.

2. A transducer including a flux source, a linearly moving storage member having intelligence recorded thereon, a rotating drum adjacent said linearly moving storage member and positioned to modulate said flux whereby said recorded intelligence is translated into an electrical control signal by means responsive to said flux, a drive mechanism for said rotating drum mechanically interconnected with said linearly moving storage member so that said mechanism is responsive to changes in speed and direction of the storage member whereby the differential speed between the drum and the storage member remains constant.

3. A transducer including a flux source, a linearly moving storage member having intelligence recorded thereon, a rotating drum adjacent said linearly moving storage member and positioned to modulate said flux whereby said recorded intelligence is translated into an electrical control signal by means responsive to said flux, a drive mechanism for said rotating drum, electrical means for sensing changes in speed and direction of the storage member, and means responsive to said electrical means for maintaining a constant differential speed between the storage member and the rotating drum.

References Cited by the Examiner
UNITED STATES PATENTS 2,771,505  11/1956  Avery _____ 340—174.1

JAMES W. MOFFITT, *Acting Primary Examiner.*

A. I. NEUSTADT, *Assistant Examiner.*